(12) United States Patent
Woo et al.

(10) Patent No.: US 10,853,910 B2
(45) Date of Patent: Dec. 1, 2020

(54) METHOD AND APPARATUS FOR PROCESSING OMNI-DIRECTIONAL IMAGE

(71) Applicants: Samsung Electronics Co., Ltd., Suwon-si (KR); KOREA UNIVERSITY RESEARCH AND BUSINESS FOUNDATION, Seoul (KR)

(72) Inventors: Jihwan Woo, Suwon-si (KR); Sungtae Kim, Suwon-si (KR); Eric Yip, Suwon-si (KR)

(73) Assignees: Samsung Electronics Co., Ltd., Suwon-si (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 16/549,668

(22) Filed: Aug. 23, 2019

(65) Prior Publication Data
US 2020/0065937 A1 Feb. 27, 2020

(30) Foreign Application Priority Data
Aug. 24, 2018 (KR) .................. 10-2018-0099020

(51) Int. Cl.
*G06T 15/20* (2011.01)
*G06T 3/00* (2006.01)
(52) U.S. Cl.
CPC .......... *G06T 3/0043* (2013.01); *G06T 15/205* (2013.01)
(58) Field of Classification Search
CPC ..................... G06T 15/205; G06T 19/006
See application file for complete search history.

(56) References Cited

U.S. PATENT DOCUMENTS 7,620,909 B2    11/2009    Park et al.
2005/0012745 A1    1/2005    Kondo et al.
(Continued)

FOREIGN PATENT DOCUMENTS

KR    10-2017-0007098 A    1/2017
KR    10-2017-0123328 A    11/2017
(Continued)

OTHER PUBLICATIONS

International Search Report and Written Opinion dated Nov. 29, 2019, issued in International Patent Application No. PCT/KR2019/010765.
(Continued)

*Primary Examiner* — Phi Hoang
(74) *Attorney, Agent, or Firm* — Jefferson IP Law, LLP

(57) ABSTRACT

A method for processing information regarding omni-directional images is provided. The method includes generating a first two-dimensional (2D) image projected from a first omni-directional image, generating a second 2D image projected from the second omni-directional image, generating a third 2D image corresponding to a 2D image projected from a third omni-directional image, generating a fourth 2D image projected from a fourth omni-directional image, generating a fifth 2D image corresponding to a 2D image projected from a fifth omni-directional image generating a sixth 2D image corresponding to a 2D image projected from a sixth omni-directional image, and generating a seventh 2D image corresponding to a 2D image projected from a seventh omni-directional image, a weight for the first omni-directional image, a weight for the second omni-directional image, and a weight for the fourth omni-directional image.

20 Claims, 14 Drawing Sheets

(56) References Cited

U.S. PATENT DOCUMENTS

| | | |
|---|---|---|
| 2017/0230633 A1 | 8/2017 | Doh |
| 2018/0063505 A1* | 3/2018 | Lee .......................... G06T 9/00 |
| 2018/0288356 A1* | 10/2018 | Ray ..................... H04N 19/124 |
| 2019/0020863 A1* | 1/2019 | Wang .................. H04N 13/243 |

FOREIGN PATENT DOCUMENTS

| | | |
|---|---|---|
| KR | 10-2018-0036359 A | 4/2018 |
| KR | 10-2018-0136873 A | 12/2018 |

OTHER PUBLICATIONS

"Summary of Survey on Virtual Reality", International Organisation for Standardisation Organisation Internationale De Normalisation, ISO/IEC JTC 1/SC 291WG 11,Coding of Moving Pictures and Audio, Oct. 1, 2016.

Hansung Kim et al., "3D Scene Reconstruction from Multiple Spherical Stereo Pairs", Jan. 1, 2013.

Heiko Hirschmuller, "Stereo Processing by Semi-Global Matching and Mutual Information", IEEE Transactions on Pattern Analysis and Machine Intelligence, Jan. 1, 2008.

Dongbo Min et al., "Fast Global Image Smoothing Based on Weighted Least Squares", IEEE Transaction on Image Processing, Jan. 1, 2014.

Sung-Ho Lee, "Omnidirectional Video Coding Using Latitude Adaptive Down-Sampling and Pixel Rearrangement", Department of IT Convergence, Graduate School Korea University, Jan. 1, 2017.

* cited by examiner

METHOD AND APPARATUS FOR PROCESSING OMNI-DIRECTIONAL IMAGE

CROSS-REFERENCE TO RELATED APPLICATION(S)

This application is based on and claims priority under 35 U.S.C. § 119(a) of a Korean patent application number 10-2018-0099020, filed on Aug. 24, 2018, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD. and 2) KOREA UNIVERSITY RESEARCH AND BUSINESS FOUNDATION.

BACKGROUND

1. Field

The disclosure relates to methods and apparatuses for obtaining omni-directional images with a new center from omni-directional images.

2. Description of Related Art

Media technology is evolving to provide high-quality media to users. Virtual reality (VR) or augmented reality (AR) technology may be one example. VR or AR technology may need development of techniques for processing or transmitting omni-directional images (or three-dimensional (3D) images).

An omni-directional image may be generated from a plurality of images obtained by an omni-directional camera or a plurality of two-dimensional (2D) cameras. VR devices are required to be able to seamlessly provide omni-directional images as user's movement in virtual reality. This may offer more real-like experiences to users.

As mentioned above, omni-directional images with various centers may be required to provide omni-directional images as users move.

It may be unrealistic to prepare for omni-directional images for VR or AR services considering all possible positions of a user's movement. In other words, it may be very hard to obtain omni-directional images corresponding to all the centers predicted by the user's movement by way of capturing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus of outputting an omni-directional image newly generated from a plurality of omni-directional images or ones selected from the plurality of omni-directional images corresponding to the user's movement.

Another aspect of the disclosure is to provide a method and apparatus of generating one or more omni-directional images with different centers from one or more omni-directional images with a single center.

Another aspect of the disclosure is to provide a method and apparatus of generating one or more omni-directional images with different centers from one or more omni-directional images with a single center.

Additional aspects will be set forth in part in the description which follows and, in part, will be apparent from the description, or may be learned by practice of the presented embodiments.

In accordance with an aspect of the disclosure, a method for processing information regarding an omni-directional image is provided. The method includes generating a first two-dimensional (2D) image projected from a first omni-directional image based on a position crossing a straight line passing through a first position which is a center of the first omni-directional image and a second position which is a center of a second omni-directional image, generating a second 2D image projected from the second omni-directional image based on the position crossing the straight line passing through the first position and the second position, generating a third 2D image corresponding to a 2D image projected from a third omni-directional image having a center in a third position between the first position and the second position, generating a fourth 2D image projected from a fourth omni-directional image based on a position crossing a straight line passing through the center of the second omni-directional image and a center of the fourth omni-directional image, generating a fifth 2D image corresponding to a 2D image projected from a fifth omni-directional image having a center in a fifth position between the second position and the fourth position based on the second 2D image and the fourth 2D image, generating a sixth 2D image corresponding to a 2D image projected from a sixth omni-directional image having a center in a sixth position between the first position and the fourth position based on the first 2D image and the fourth 2D image, and generating a seventh 2D image corresponding to a 2D image projected from a seventh omni-directional image having a center in a seventh position between the first position, the second position, and the fourth position based on the third 2D image, the fifth 2D image, the sixth 2D image, a weight for the first omni-directional image, a weight for the second omni-directional image, and a weight for the fourth omni-directional image.

In accordance with another aspect of the disclosure, a device for processing information regarding an omni-directional image is provided. The device includes a communication interface and a processor connected with the communication interface. The processor is configured to generate a first two-dimensional (2D) image projected from a first omni-directional image based on a position crossing a straight line passing through a first position which is a center of the first omni-directional image and a second position which is a center of a second omni-directional image, generate a second 2D image projected from the second omni-directional image based on the position crossing the straight line passing through the first position and the second position, generate a third 2D image corresponding to a 2D image projected from a third omni-directional image having a center in a third position between the first position and the second position, generate a fourth 2D image projected from a fourth omni-directional image based on a position crossing a straight line passing through the center of the second omni-directional image and a center of the fourth omni-directional image, generate a fifth 2D image corresponding to a 2D image projected from a fifth omni-directional image having a center in a fifth position between the second position and the fourth position based on the second 2D image and the fourth 2D image, generate a sixth 2D image corresponding to a 2D image projected from a sixth omni-directional image having a center in a sixth position between the first position and the fourth position based on the first 2D image and the fourth 2D image, and generate a seventh 2D image corresponding to a 2D image projected from a seventh omni-directional image having a center in a seventh position between the first position, the second position, and the fourth position based on the third 2D image, the fifth 2D image, the sixth 2D image, a weight for the first omni-directional image, a weight for the second omni-directional image, and a weight for the fourth omni-directional image.

Details of other embodiments are set forth in the detailed description and the drawings.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
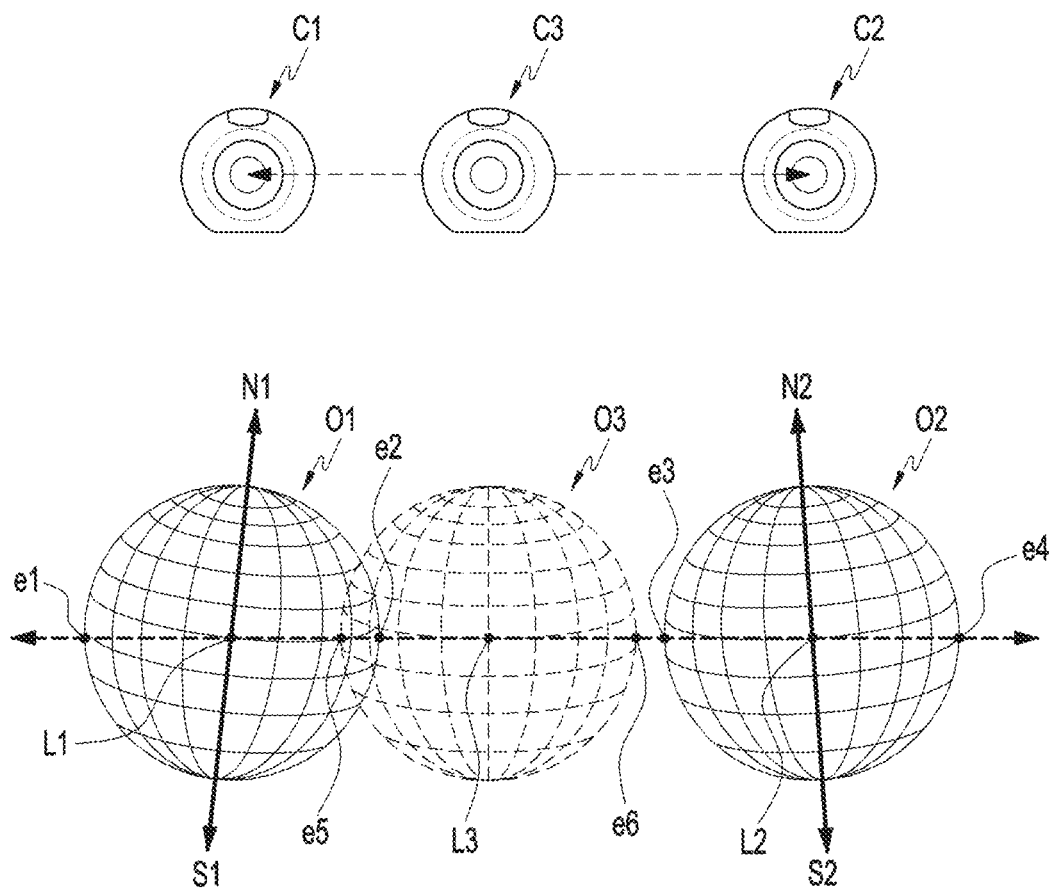
FIG. 1 is a view illustrating an example of generating an omni-directional image with a new center according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, it those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

For example, examples of the electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera, or a wearable device. According to an embodiment of the disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

In some embodiments, the electronic device may be a home appliance. Examples of the home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a television (TV) box (e.g., Samsung HomeSync™, Apple TV™, or Google TV™), a gaming console (Xbox™ PlayStation™), an electronic dictionary, an electronic key, a camcorder, or an electronic picture frame.

According to an embodiment of the disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, electronic or gas meters, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to an embodiment of the disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the disclosure. As used herein, the term "user" may denote a human or another device (e.g., an artificial intelligent electronic device) using the electronic device.

FIG. 1 is a view illustrating an example of generating an omni-directional image with a new center according to an embodiment of the disclosure.

Referring to FIG. 1, a first camera C1 and a second camera C2 each may generate an omni-directional image by image capturing. To that end, the first camera C1 and the second camera C2 each may be constituted of a single camera or a set of multiple cameras. The first camera C1 and the second camera C2 may have different centers and be spaced apart from each other at a predetermined distance.

According to an embodiment, a first omni-directional image O1 may be captured and generated by the first camera C1. A second omni-directional image O2 may be captured and generated by the second camera C2. The first omni-directional image O1 and the second omni-directional image O2 each may be rendered in a spherical shape. The center L1 of the first omni-directional image O1 may correspond to the position of the first camera C1. The center L2 of the second omni-directional image O2 may correspond to the position of the second camera C2.

Epipoles e1, e2, e3, and e4 may be defined as points where a line connecting the center L1 of the first omni-directional image O1 and the center L2 of the second omni-directional image O2 crosses the first omni-directional image O1 and the second omni-directional image O2.

Data about a third omni-directional image O3 may be generated based on data about the first omni-directional image O1 and data about the second omni-directional image O2. The third omni-directional image O3 may be regarded as an omni-directional image obtainable by a third camera C3. The third camera C3 may be a virtual camera. The center L3 of the third omni-directional image O3 may correspond to the position of the third camera C3. The center L3 of the third omni-directional image O3 may be positioned between the center L1 of the first omni-directional image O1 and the center L2 of the second omni-directional image O2 on a line connecting the center L1 of the first omni-directional image O1 and the center L2 of the second omni-directional image O2.

An axis passing through the north pole N1 and south pole S1 of the first omni-directional image O1 may not be parallel with an axis passing through the north pole N2 and south pole S2 of the second omni-directional image O2. In this case, a first 2D image projected from the first omni-directional image O1 and a second 2D image projected from the second omni-directional image O2 may not be aligned with each other. The first 2D image may be projected from the first omni-directional image O1 in an equirectangular projection (ERP) scheme with respect to the north pole N1 and south pole S1 of the first omni-directional image O1. The second 2D image may be projected from the second omni-directional image O2 in the ERP scheme with respect to the north pole N2 and south pole S2 of the second omni-directional image O2. Generating the data about the third omni-directional image O3 from the 2D images not aligned may increase the complexity of processing and resultantly system loads and power consumption.

Figure 2:
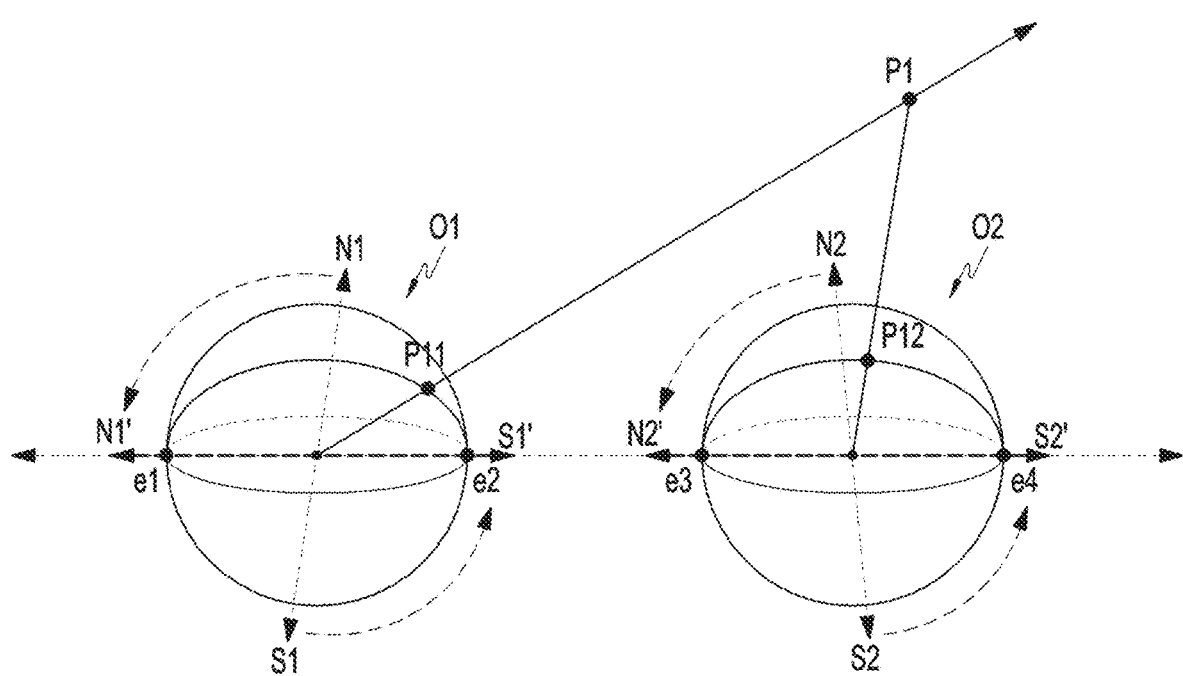
FIG. 2 is a view illustrating an example of viewing the respective different centers of omni-directional images from a particular position according to an embodiment of the disclosure.

FIG. 2 is a view illustrating an example of viewing the respective different centers of omni-directional images from a particular position according to an embodiment of the disclosure.

Referring to FIG. 2, the north poles N1 and N2 and south poles S1 and S2 of omni-directional images O1 and O2 may be reset to the positions of epipoles e1, e2, e3, and e4.

According to an embodiment, the north pole N1 and south pole S1 of the first omni-directional image O1 may be set to a first epipole e1 and a second epipole e2, respectively. The north pole N2 and south pole S2 of the second omni-directional image O2 may be set to a third epipole e3 and a fourth epipole e4, respectively. For example, setting the north pole or south pole of an omni-directional image to an epipole may be enabled by rotating the omni-directional image. In the drawings, the direction and distance for rotating the omni-directional image are represented in dashed lines.

A first point P1 on a space may be displayed in a first position P11 of the first omni-directional image O1 and a second position P12 of the second omni-directional image O2. The longitude of the first position P11 and the longitude of the second position P12 may be identical to each other based on the reset north poles N1' and N2' and reset south poles S1' and S2' of the omni-directional images O1 and O2. Not only for the first point P1, the longitude of the position where any point on the space is displayed on the first omni-directional image O1 and the longitude of the position where the point is displayed on the second omni-directional image O2 may be identical to each other.

ERP may be performed on each of the omni-directional images O1 and O2 based on the reset north poles N1' and N2' and reset south poles S1' and S2' of the omni-directional images O1 and O2.

Figure 3:
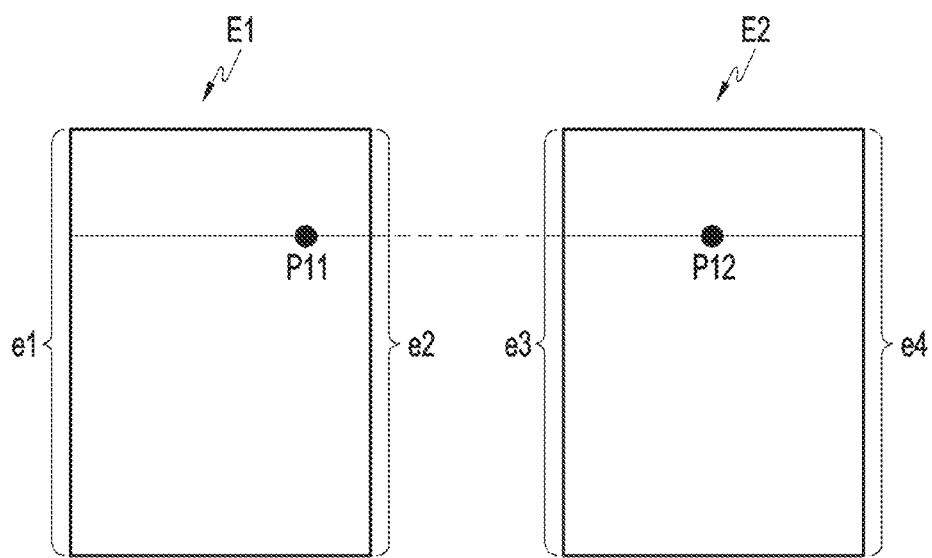
FIG. 3 is a view illustrating an example of projecting two omni-directional images with different centers in an equirectangular projection (ERP) scheme according to an embodiment of the disclosure.

FIG. 3 is a view illustrating an example of projecting two omni-directional images with different centers in an equirectangular projection (ERP) scheme according to an embodiment of the disclosure.

Referring to FIG. 3, a first 2D image E1 and a second 2D image E2 may be generated by being projected in an ERP scheme from the first omni-directional image O1 and the second omni-directional image O2, respectively. The left side and right side of the first 2D image E1 may correspond to a first epipole e1 and a second epipole e2, respectively.

For example, in the ERP scheme, the y coordinate of a particular position of a 2D image may correspond to the longitude of a corresponding position of the omni-directional image. The x coordinate of the 2D image may correspond to an angle from the center of the omni-directional image between the corresponding position and north pole (i.e., an epipole) of the omni-directional image. Thus, the y coordinate of the first position P11 on the first 2D image E1 and the y coordinate of the second position P12 on the second 2D image E2 may be identical to each other. Likewise, the positions of any position on the first 2D image E1 and a corresponding position on the second 2D image E2 may have the same y coordinate. In other words, since the corresponding positions on the 2D images E1 and E2 are aligned on the same y coordinate, the process of generating data about the third omni-directional image O3 based on the 2D images E1 and E2 may be simplified.

Figure 4:
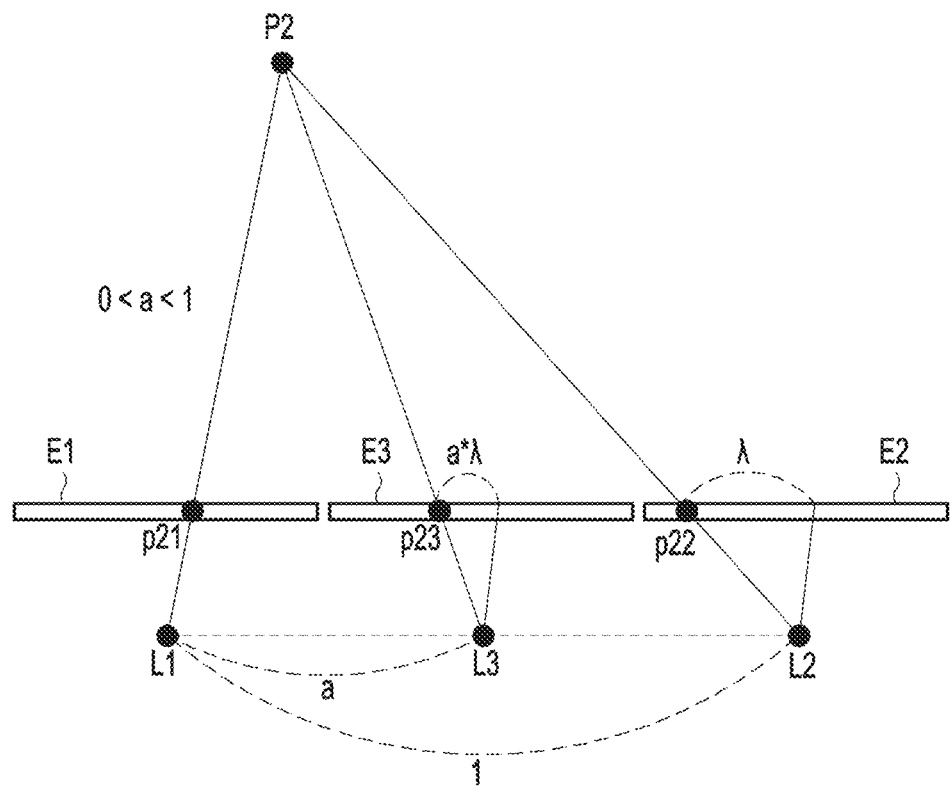
FIG. 4 is a view illustrating an example of generating a third 2D image based on a first and second 2D image according to an embodiment of the disclosure.

FIG. 4 is a view illustrating an example of generating a third 2D image based on a first and second 2D image according to an embodiment of the disclosure.

Referring to FIG. 4, any second position P2 on a space may be displayed in a third position p21 on the first 2D image E1 and a fourth position p22 on the second 2D image E2. A third 2D image E3 may correspond to an image projected from the third omni-directional image O3 in an ERP scheme. The second position P2 may be displayed in a fifth position p23 on the third 2D image E3.

The y coordinates of the third position p21, fourth position p22, and fifth position p23 may be identical.

As shown, λ may be defined by the disparity value between the x coordinate of the third position p21 and the x coordinate of the fourth position p22. In other words, when the x coordinate of the third position p21 is x1 and the x coordinate of the fourth position p22 is x2, λ=x1−x2. When the x coordinate of the fifth position p23 is x3, x3=x1−a×λ. Here, a is the ratio of the distance between the center L1 of the first omni-directional image O1 and the center L3 of the third omni-directional image O3 to the distance between the center L1 of the first omni-directional image O1 and the center L2 of the second omni-directional image O2. The third 2D image E3 may be generated by identifying the positions on the third 2D image E3 corresponding to the points on the space in such a manner. The third 2D image E3 may correspond to a 2D image generated by projecting the third omni-directional image O3 in the ERP scheme, while setting the points e5 and e6 (i.e., epipoles) on the third omni-directional image O3 crossing the straight line passing through the center L1 of the first omni-directional image O1 and the center L2 of the second omni-directional image O2 to the north pole and south pole, respectively.

Figure 5:
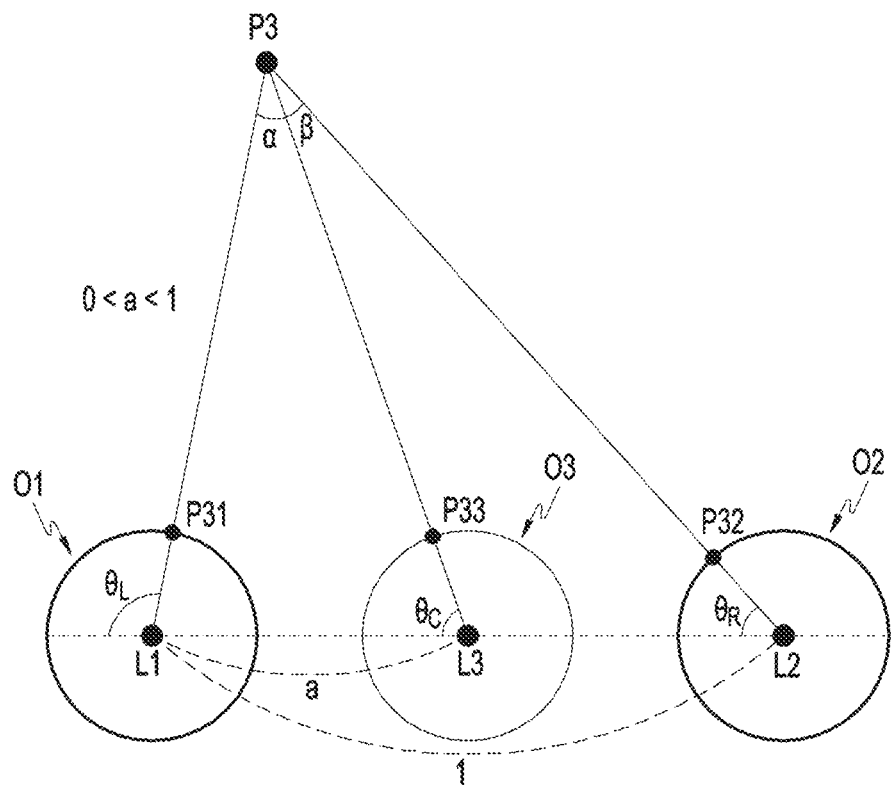
FIG. 5 is a view illustrating an example of generating a third 2D image based on a first and second 2D image according to an embodiment of the disclosure.

FIG. 5 is a view illustrating an example of generating a third 2D image based on a first and second 2D image according to an embodiment of the disclosure.

Referring to FIG. 5, the third point P3 on the space may be displayed in a sixth position P31 on the first omni-directional image O1, a seventh position P32 on the second omni-directional image O2, and an eighth position P33 on the third omni-directional image O3. The x coordinate of a position on a projected 2D image in the ERP scheme corresponding to a particular position on the omni-directional image may correspond to an angle from the center of the omni-directional image between the particular position on the omni-directional image and the north pole (i.e., epipole) of the omni-directional image.

According to an embodiment, the x coordinate on the first 2D image E1 of the sixth position P31 may correspond to $\theta_L$. The x coordinate of the second 2D image E2 of the seventh position P32 may correspond to OR. The disparity value between the x coordinate on the first 2D image E1 of the sixth position P31 and the x coordinate on the second 2D image E2 of the seventh position P32 may be expressed as $\theta_L-\theta_R$ which is the same as $\alpha+\beta$.

The x coordinate on the second image projected in the ERP scheme from the third omni-directional image O3 of the eighth position P33 may correspond to $\theta_C$. $\theta_C=\theta_L-\alpha$. Here, a may be obtained by Equation 1 below.

$$\alpha = \tan^{-1}\left(\frac{\sin(\theta_L - \theta_R)}{\frac{(1-a)}{a\sin\theta_L} + \cos(\theta_L - \theta_R)}\right) \quad \text{Equation 1}$$

The y coordinates on the 2D image of the sixth position P31, seventh position P32, and eighth position P33 may be identical to each other.

The positions on the 2D image projected in the ERP scheme from the third omni-directional image O3 corresponding to the points on the space may be identified in such a scheme. In this case, the 2D image may be generated by projecting in the ERP scheme, with the epipoles e5 and e6 from the third omni-directional image O3 set to the north pole and south pole, respectively.

Figure 6:
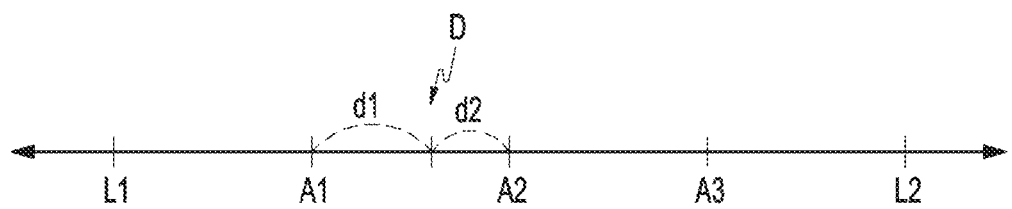
FIG. 6 is a view illustrating an example of setting a center of a third omni-directional image according to an embodiment of the disclosure.

FIG. 6 is a view illustrating an example of setting a center of a third omni-directional image according to an embodiment of the disclosure.

Referring to FIG. 6, the center L3 of the third omni-directional image O3 may be present on the straight line passing through the center L1 of the first omni-directional image O1 and the center L2 of the second omni-directional image O2. For example, the center L3 of the third omni-directional image O3 may be selected from among quantized positions A1, A2, and A3 between the center L1 of the first omni-directional image O1 and the center L2 of the second omni-directional image O2. Although three quantized positions A1, A2, and A3 are provided as an example, the number of quantized positions may be more or less than three. The interval between the center L1 of the first omni-directional image O1, the center L2 of the second omni-directional image O2, and the plurality of quantized positions A1, A2, and A3 may be set to be uniform. However, the interval is not necessarily uniform.

According to an embodiment, the center L3 of the third omni-directional image O3 may be set by the position closest to the device D for displaying the omni-directional image or the user of the device D among the plurality of quantized positions A1, A2, and A3. For example, the second quantized position A2 may be set to the center of the third omni-directional image O3. When the distances between the plurality of quantized positions A1, A2, and A3 and the device D for displaying the omni-directional image or the user of the device D are larger than the distance between the center L1 of the first omni-directional image O1 and the device D for displaying the omni-directional image and the user of the device D, the image corresponding to the first omni-directional image O1 may be displayed on the device D for displaying the omni-directional image. In such a case, the third omni-directional image O3 may not be generated or may not be transferred to the device D for displaying the omni-directional image.

According to an embodiment, when the device D or the user of the device D is on the move, if the distance ratio of the distance between the device D and an adjacent quantized position among the plurality of quantized positions A1, A2, and A3 to the distance between the device D and the center of the omni-directional image being currently displayed on the device D is less than or not more than a threshold, the device D may display the omni-directional image whose center lies in the adjacent quantized position. To that end, a device (e.g., a server) for transmitting data about the omni-directional image may generate data regarding the omni-directional image whose center lies in the adjacent quantized position and transmit the data to the device D. When the omni-directional image whose center lies in the first quantized position A1 is currently being displayed on the device D, if the distance ratio of the distance d2 between the device D and the second quantized position A2 to the distance d1 between the device D and the first quantized position A1 is less than or not more than a threshold, the device D may display the omni-directional image whose center lies in the second quantized position A2.

According to an embodiment, the device for transmitting the data about the omni-directional image may previously generate and store data regarding the omni-directional image whose center is in each of the plurality of quantized positions A1, A2, and A3. The device for transmitting the data about the omni-directional image may transmit omni-directional image-related data selected as necessary among the pieces of data about the plurality of omni-directional images pre-generated and stored to the device D.

According to an embodiment, the device D may store the data about the omni-directional image whose center is in each of the plurality of quantized positions A1, A2, and A3. The device D may retrieve data about the omni-directional image selected as necessary among the pieces of data about the plurality of omni-directional images as stored.

Figure 7:
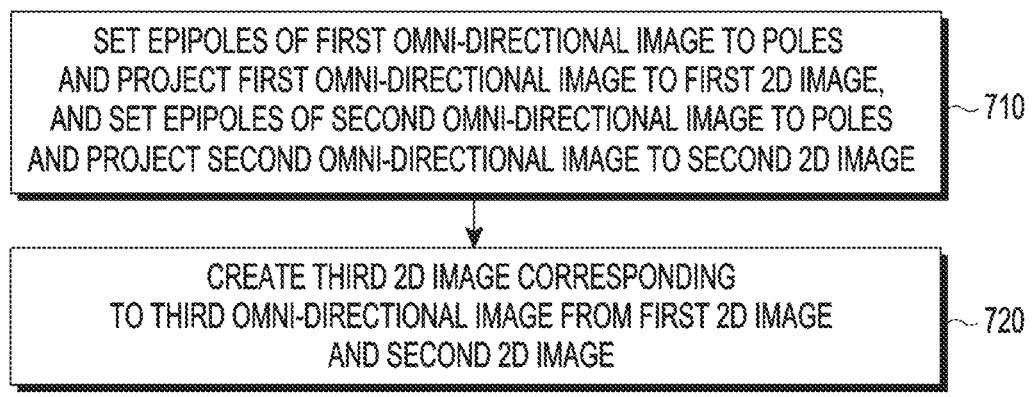
FIG. 7 is a flowchart illustrating a control example for processing an omni-directional image according to an embodiment of the disclosure.

FIG. 7 is a flowchart illustrating a control example for processing an omni-directional image according to an embodiment of the disclosure.

Referring to FIG. 7, in operation 710, a process for processing omni-directional images may set epipoles of a first omni-directional image to the poles to project the first omni-directional image to a first 2D image and may set epipoles of a second omni-directional image to the poles to project the second omni-directional image to a second 2D image. The details of operation 710 have been described above in connection with FIGS. 2 and 3.

In operation 720, the processor may generate a third 2D image corresponding to a third omni-directional image from the first 2D image and the second 2D image. Operation 720 may include the operations described above in connection with FIG. 4 or 5.

Operations 710 and 720 of FIG. 7 may be performed by a device (e.g., a server) for transmitting data about omni-directional images. According to an embodiment, operations 710 and 720 of FIG. 7 may be performed by a device (e.g., a VR device) for displaying data about omni-directional images.

Figure 8:
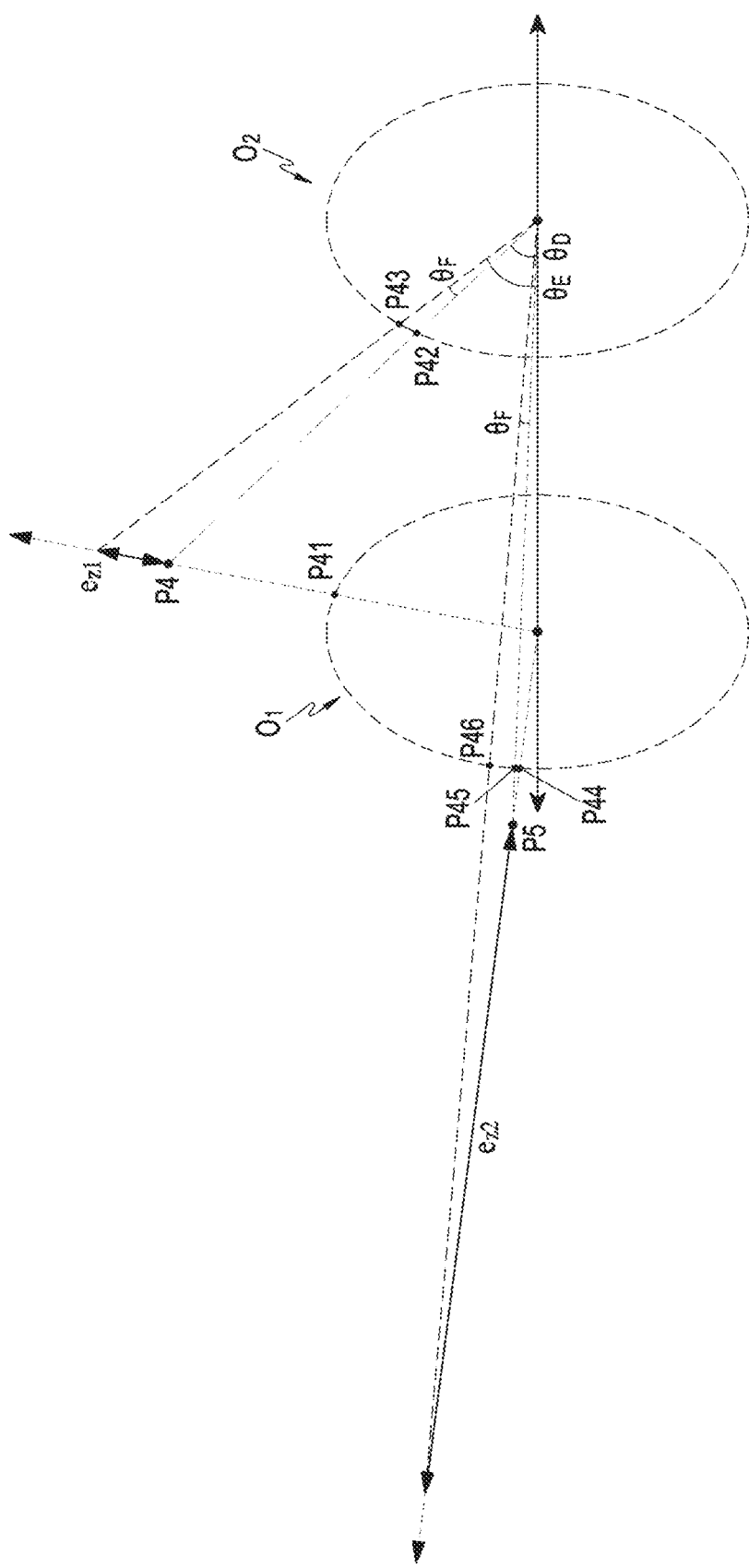
FIG. 8 is a view illustrating an error in depth evaluation on a first and second 2D image according to an embodiment.

FIG. 8 is a view illustrating an error in depth evaluation on a first and second 2D image according to an embodiment of the disclosure.

Referring to FIG. 8, a fourth position P4 on a space may be in a ninth position P41 on the first omni-directional image O1 or a tenth position P42 on the second omni-directional image O2. However, a processing error may cause the fourth position P4 on the space to be displayed in an eleventh position P43 on the second omni-directional image O2.

The x coordinate on the second 2D image E2 of the tenth position P42 may correspond to $\theta_D$, and the x coordinate on the second 2D image E2 of the eleventh position P43 may correspond to $\theta_E$. According to an embodiment, an error corresponding to $\theta_F = \theta_E - \theta_D$ may occur in the x coordinate on the second 2D image E2 for the fourth position P4 on the space. The error corresponding to OF may cause a depth error $e_{z1}$.

The fifth position P5 on the space positioned near the epipole may be in a twelfth position P44 on the first omni-directional image O1 or a thirteenth position P45 on the second omni-directional image O2. However, the error corresponding to OF may cause the fifth position P5 on the space to be displayed in a fourteenth position P46 on the second omni-directional image O2.

Although the error corresponding to OF occurs in the x coordinate on the second 2D image E2 for the fifth position P5 like the fourth position P4, a depth error $e_{z2}$ which is larger than $e_{z1}$ is caused near the epipole. In other words, a small disparity value of x coordinate may cause a large depth error near the epipole.

When a third 2D image is generated based on the first and second 2D images which have a depth error, the third 2D image may be incomplete. Thus proposed is a method of generating a complete third 2D image E3 by adding a 2D image other than the first 2D image and the second 2D image to obtain information about the corresponding area.

Figure 10A:
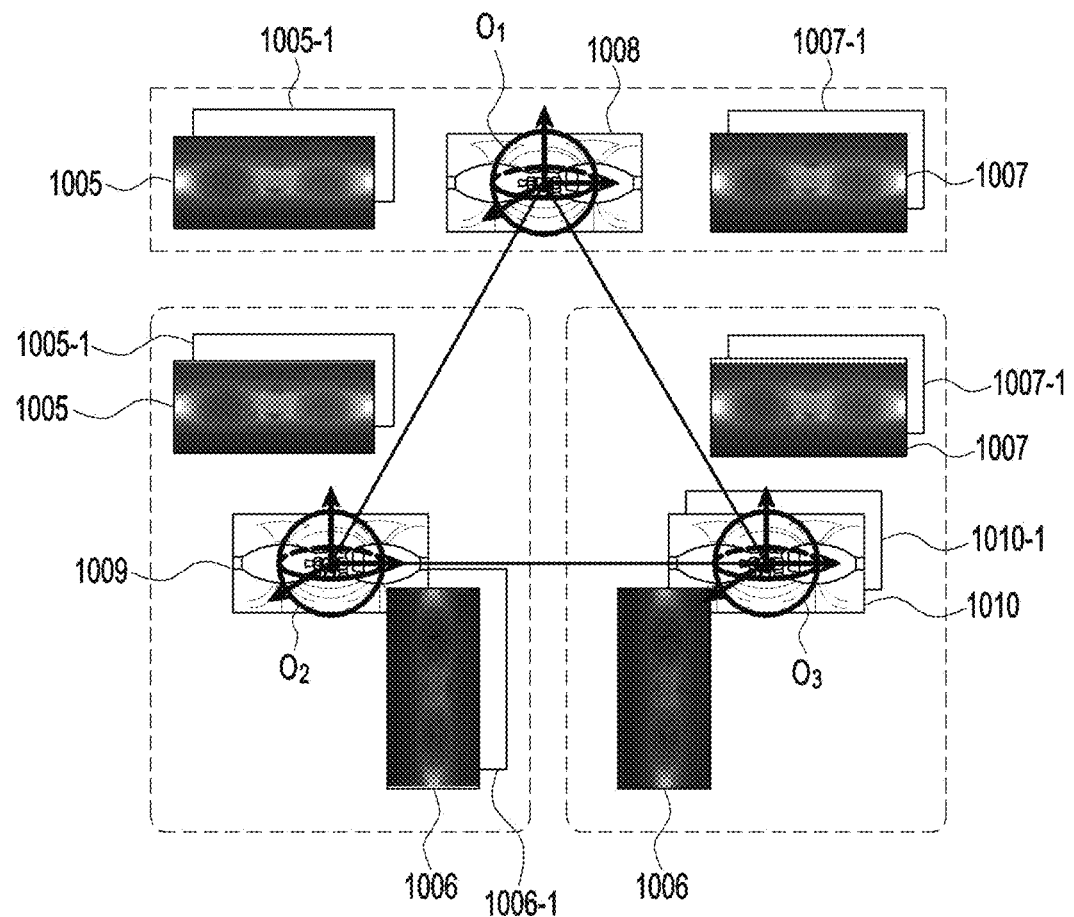
FIGS. 10A and 10B are views illustrating examples of generating a fourth 2D image according to various embodiment of the disclosure.

Referring to FIG. 10A, the first omni-directional image O1 corresponding to the first camera C1, the second omni-directional image O2 corresponding to the second camera C2, and the third omni-directional image O3 corresponding to the third camera C3 each may have two depth maps (2D images). The first omni-directional image O1 has a fifth depth map (fifth 2D image 1005) for the first omni-directional image O1 and the second omni-directional image O2 and a seventh depth map (seventh 2D image 1007) for the first omni-directional image O1 and the third omni-directional image O3. Since the fifth depth map and the seventh depth map have large depth errors in different areas (near the epipole), an accurate eighth depth map (eighth 2D image 1008) may be generated by combining the depth values of the fifth depth map and the seventh depth map.

What has been proposed herein is not limited to the fifth depth map and the seventh depth map and there may be more depth maps depending on an increase in the number of cameras. As more depth maps are there, the third 2D image E3 may become more accurate.

Reliability is needed in obtaining the eighth depth map (eighth 2D image 1008) by combining the fifth depth map and the seventh depth map. Reliability means pixel weights to the fifth depth map and the seventh depth map. In generating the eighth depth map, it is determined based on reliability how much weight is assigned to the pixel of which depth map. Here, the reliability sum for the mutually corresponding pixels in the fifth depth map and the seventh depth map is 1.

For example, the reliability of the third pixel in the fifth depth map may be 0.7, and the reliability of the third pixel in the seventh depth map may be 0.3. Accordingly, the reliability sum for the third pixels of the fifth depth map and the seventh depth map may be 1. Each pixel may have a different reliability. The reliability may be a real number from 0 to 1, and the real number being larger may mean that the reliability is high while the real number being smaller may mean that the reliability is low.

The pixels corresponding to the center of a sphere has a high reliability and the pixels which are near the epipole has a low reliability. This is why near the epipole, even a small error may cause a significant error in actual depth estimation.

A method for calculating reliability is described in detail with reference to FIG. 12. The eighth depth map may be generated based on the pixel values obtained by multiplying reliability and depth for each pixel of the fifth depth map and the seventh depth map. When the depth disparity between the fifth depth map and the seventh depth map for one pixel is smaller than a predetermined threshold, the pixel value is calculated based on the reliability, and otherwise, the pixel value of the depth map with the higher reliability is used. This is called a winner takes all scheme.

According to an embodiment, a 3D image corresponding to a fourth omni-directional image O4 may be generated. Since the cameras C1, C2, and C3 have the same center, the 3D position of each pixel may be calculated based on the position of each camera C1, C2, and C3. In other words, the 3D position (x,y,z) of each pixel for an eighth 2D image 1008, a ninth 2D image 1009, and a tenth 2D image 1010 corresponding to the cameras C1, C2, and C3 may be calculated. A 3D image corresponding to the fourth 2D image 1004 may be generated based on the 3D position of each pixel.

The position and direction of a camera (C4, not shown in the drawings) corresponding to the fourth omni-directional image O4 may be determined to generate the 3D image. Here, the position and direction of the camera match the user's viewpoint. The user's viewpoint may be varied as the user's movement.

Like the position and direction of the camera, the position and direction of the eighth depth map (eighth 2D image), the ninth depth map (ninth 2D image), and the tenth depth map (tenth 2D image) corresponding to the first omni-directional image O1, the second omni-directional image O2, and the third omni-directional image O3 shown in FIG. 10A are varied. Thereafter, an ERP image, i.e., a 3D image, corresponding to the fourth omni-directional image O4 is generated.

Each pixel of the ERP image has 3D information (x,y,z). The color value corresponding to the 3D image (x,y,z) is determined using the pixel value corresponding to the 3D information about the first omni-directional image O1, the second omni-directional image O2, and the third omni-directional image O3. The pixel value is calculated based on the weight which is inversely proportional to the distance between the camera C1 corresponding to the first omni-directional image O1 and the camera C4 corresponding to the fourth omni-directional image O4, the distance between the camera C2 corresponding to the second omni-directional image O2 and the camera C4 corresponding to the fourth omni-directional image O4, and the distance between the camera C3 corresponding to the third omni-directional image O3 and the camera C4 corresponding to the fourth omni-directional image O4. Here, the weight sum for one pixel is 1.

When the color value disparity for the corresponding pixels in the eighth depth map, ninth depth map, and tenth depth map is not more than a threshold, the weighted mean of the color values of the eighth depth map, ninth depth map, and tenth depth map is determined to be the color value of the corresponding pixels. When the color value disparity for the pixels exceeds the threshold, the color value with the largest weight in the pixels of the eighth depth map, ninth depth map, and tenth depth map is determined to be the color value of the pixels in the 3D image.

Figure 9:
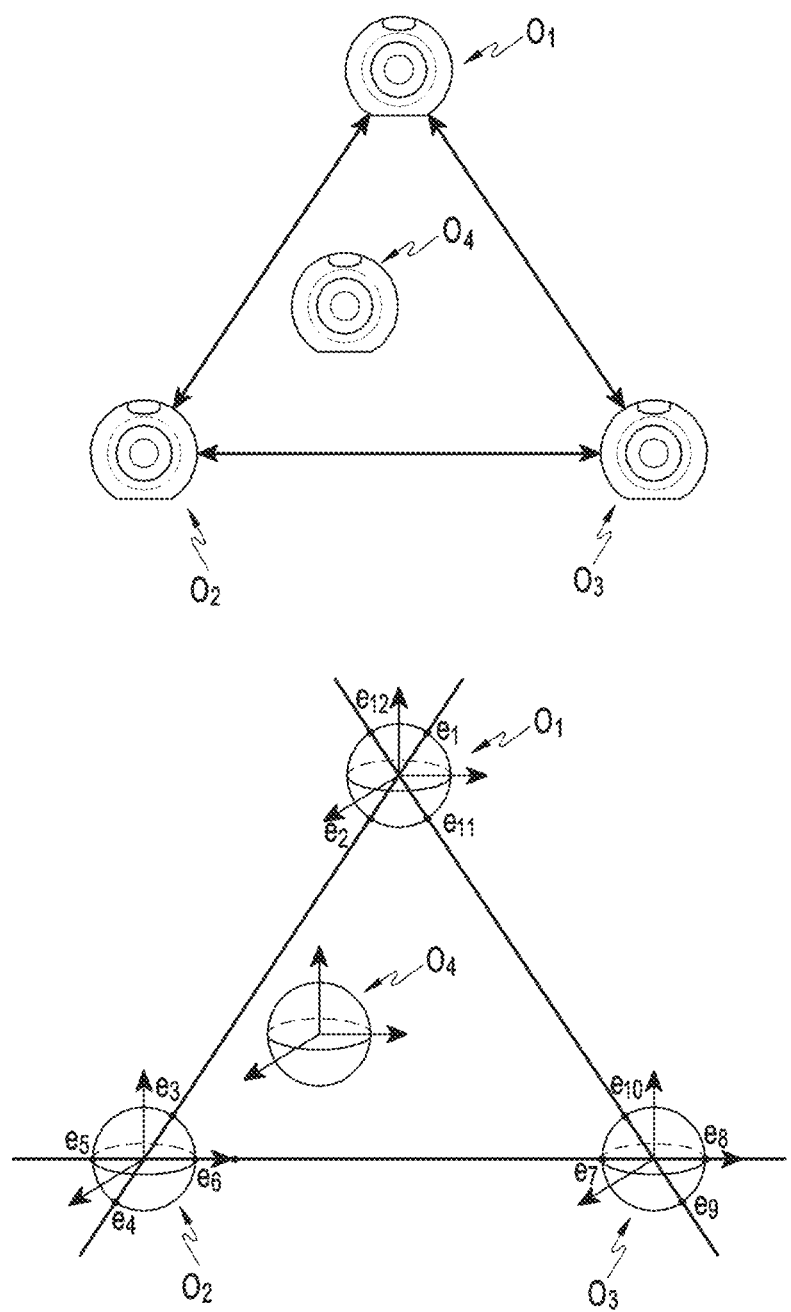
FIG. 9 is a view illustrating cameras and omni-directional images corresponding to the cameras, wherein cameras for processing omni-directional images are arranged according to an embodiment of the disclosure.

FIG. 9 is a view illustrating cameras and omni-directional images corresponding to the cameras according to an embodiment of the disclosure. Although three cameras are shown for the purpose of illustration, embodiments of the disclosure are not limited thereto, and three or more cameras may be present.

Referring to FIG. 9, the first camera C1, the second camera C2, and the third camera C3, each, may be a single omni-directional camera or a set of a plurality of cameras. The first omni-directional image O1 may be captured and generated by the first camera C1. The second omni-directional image O2 may be captured and generated by the second camera C2. The third omni-directional image O3 may be captured and generated by the third camera C3.

At this time, the epipoles e1, e2, e3, and e4 of the first omni-directional image O1 and the second omni-directional image O2 may be positioned on the same straight line. The epipoles e5, e6, e7, and e8 of the second omni-directional image O2 and the third omni-directional image O3 may be positioned on the same straight line. The epipoles e9, e10, e11, and e12 of the third omni-directional image O3 and the first omni-directional image O1 may be positioned on the same straight line.

Data about the fourth omni-directional image O4 may be generated based on data about the first omni-directional image O1, data about the second omni-directional image O2, and data about the third omni-directional image O3. The fourth omni-directional image O4 may correspond to an image obtained by the fourth camera C4.

Figure 10B:
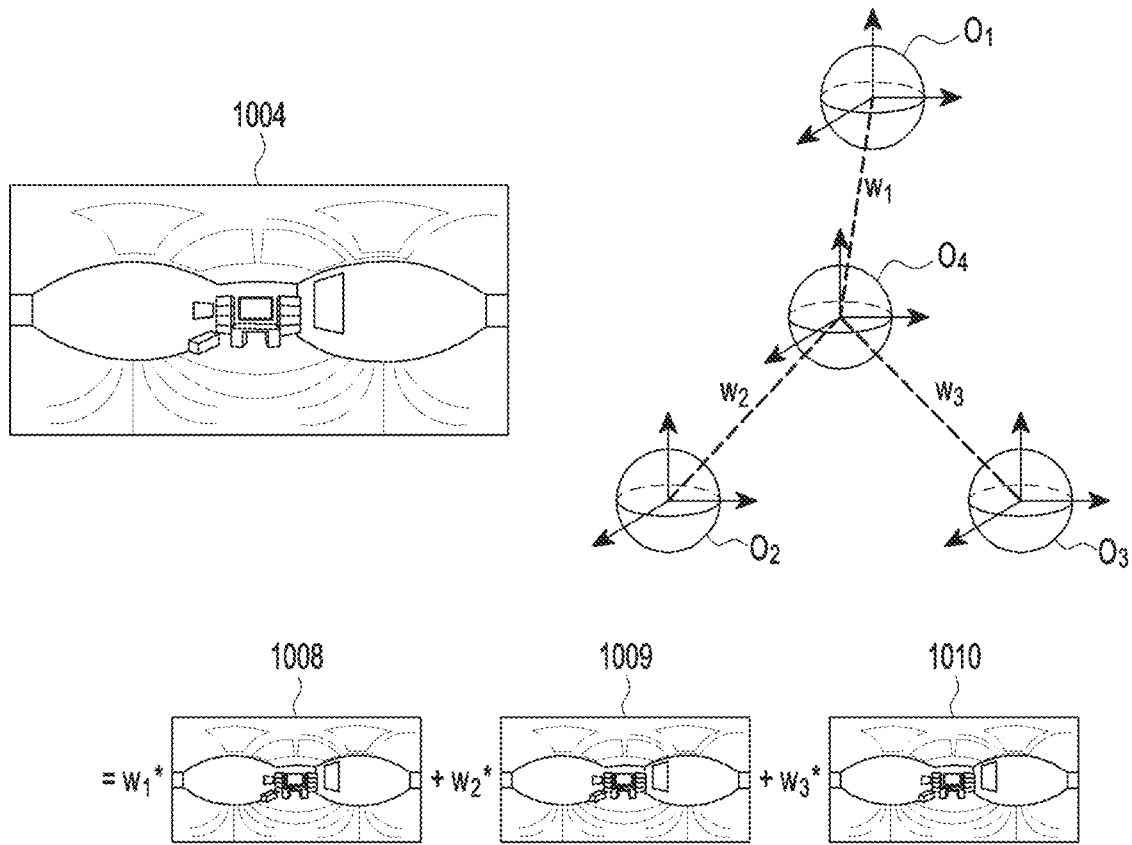

FIGS. 10A and 10B are views illustrating examples of generating a fourth 2D image according to various embodiments of the disclosure.

Figure 11:
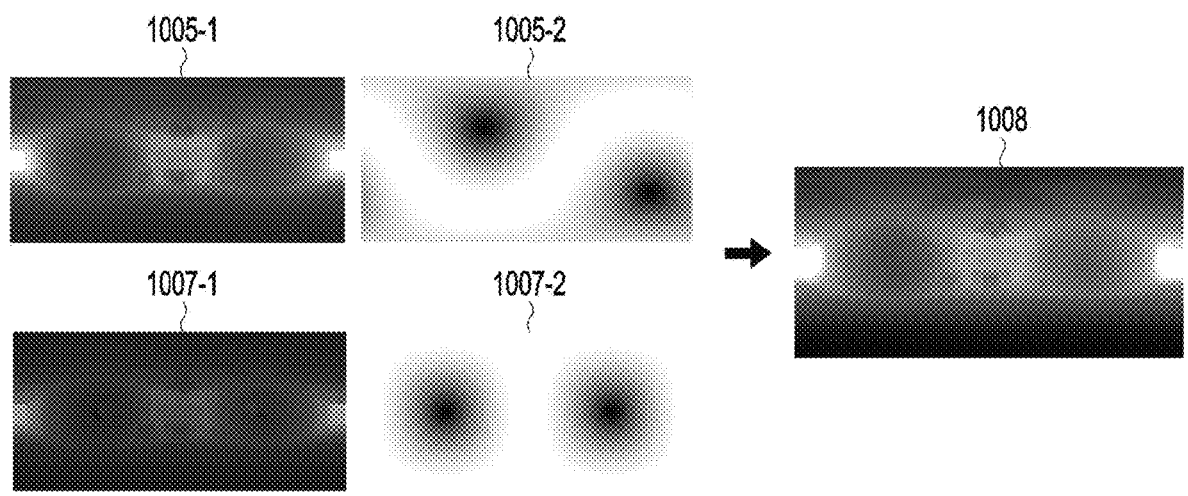
FIG. 11 is a view illustrating an example of generating a fourth 2D image using a weight map according to an embodiment of the disclosure.

FIG. 11 is a view illustrating an example of generating a fourth 2D image using a weight map according to an embodiment of the disclosure. For ease of description, FIGS. 10A, 10B, and 11 are described together.

Referring to FIG. 10A, a specific method of generating a fourth 2D image corresponding to the fourth omni-directional image O4 is described below.

To generate the fourth 2D image corresponding to the fourth omni-directional image O4, the processor generates a fifth 2D image 1005 based on the first omni-directional image O1 and the second omni-directional image O2, a sixth 2D image 1006 based on the second omni-directional image O2 and the third omni-directional image O3, and a seventh 2D image based on the third omni-directional image O3 and the first omni-directional image O1.

The fifth 2D image 1005, the sixth 2D image 1006, and the seventh 2D image 1007 may be generated by the method described above in connection with FIGS. 4, 5, and 6.

With respect to the first omni-directional image O1, the fifth 2D image 1005 and the seventh 2D image 1007 are used in generating the fourth 2D image.

Since the fifth 2D image 1005 and the seventh 2D image 1007 have different epipoles, the fifth 2D image 1005 and the seventh 2D image 1007 are projected in an ERP scheme to make their epipoles match each other, thereby generating a fifth-first 2D image 1005-1 and a seventh-first 2D image 1007-1.

Weight maps are described below with reference to FIG. 12.

The reliability may be reduced due to a depth error near the epipoles of the fifth-first 2D image 1005-1 and the seventh-first 2D image 1007-1. Accordingly, the processor may synthesize the fifth-first 2D image 1005-1 and the seventh-first 2D image 1007-1 based on a fifth weight map corresponding to the fifth-first 2D image 1005-1 and a seventh weight map corresponding to the seventh-first 2D image 1007-1, thereby generating an eighth 2D image 1008.

With respect to the second omni-directional image O2, the fifth 2D image 1005 and the sixth 2D image 1006 are used in generating the fourth 2D image.

Since the fifth 2D image 1005 and the sixth 2D image 1006 have different epipoles, the processor projects the fifth 2D image 1005 and the sixth 2D image 1006 in an ERP scheme to make their epipoles match each other, thereby generating a fifth-first 2D image 1005-1 and a sixth-first 2D image 1006-1.

The reliability may be reduced due to a depth error near the epipoles of the fifth-first 2D image 1005-1 and the sixth-first 2D image 1006-1. Accordingly, the processor may synthesize the fifth-first 2D image 1005-1 and the sixth-first 2D image 1006-1 based on a fifth weight map corresponding to the fifth-first 2D image 1005-1 and a sixth weight map corresponding to the sixth-first 2D image 1006-1, thereby generating a ninth 2D image 1009.

With respect to the third omni-directional image O3, the sixth 2D image 1006 and the seventh 2D image 1007 are used in generating the fourth 2D image.

Since the sixth 2D image 1006 and the seventh 2D image 1007 have different epipoles, the processor projects the sixth 2D image 1006 and the seventh 2D image 1007 in an ERP scheme to make their epipoles match each other, thereby generating a sixth-first 2D image 1006-1 and a seventh-first 2D image 1007-1.

The reliability may be reduced due to a depth error near the epipoles of the sixth-first 2D image 1006-1 and the seventh-first 2D image 1007-1. Accordingly, the processor may synthesize the sixth-first 2D image 1006-1 and the seventh-first 2D image 1007-1 based on a sixth weight map corresponding to the sixth-first 2D image 1006-1 and a seventh weight map corresponding to the seventh-first 2D image 1007-1, thereby generating a tenth 2D image 1010.

Referring to FIG. 11 in connection with the method of generating the eighth 2D image 1008, the processor compares the respective corresponding pixel values of the fifth-first 2D image 1005-1 and the seventh-first 2D image 1007-1. For example, the processor determines whether a difference in (0, 0) pixel value between the fifth-first 2D image 1005-1 and the seventh-first 2D image 1007-1 exceeds a predetermined threshold.

Unless the difference in (0, 0) pixel value between the fifth-first 2D image 1005-1 and the seventh-first 2D image 1007-1 exceeds the predetermined threshold, the processor may synthesize the (0, 0) pixel value of the fifth-first 2D image 1005-1 and the (0, 0) pixel value of the seventh-first 2D image 1007-1 using the mean of the weight of the fifth weight map 1005-2 and the weight of the seventh weight map 1007-2 corresponding to the (0, 0) pixel value.

When the difference in (0, 0) pixel value between the fifth-first 2D image 1005-1 and the seventh-first 2D image 1007-1 exceeds the predetermined threshold, the processor may synthesize the (0, 0) pixel value of the fifth-first 2D image 1005-1 and the (0, 0) pixel value of the seventh-first 2D image 1007-1 using the larger of the weight of the fifth weight map 1005-2 and the weight of the seventh weight map 1007-2 corresponding to the (0, 0) pixel value.

Thus, the processor may generate the eighth 2D image 1008 by synthesis based on the weights of the respective pixels of the fifth-first 2D image 1005-1 and the seventh-first 2D image 1007-1.

The processor may generate a ninth 2D image 1009 by synthesis based on the weights of the respective pixels of the fifth-first 2D image 1005-1 and the sixth-first 2D image 1006-1 as set forth above.

The processor may generate a tenth 2D image 1010 by synthesis based on the weights of the respective pixels of the sixth-first 2D image 1006-1 and the seventh-first 2D image 1007-1 as set forth above.

Referring to FIG. 10B, the fourth 2D image 1004 may be generated by synthesizing the eighth 2D image 1008, the ninth 2D image 1009, and the tenth 2D image 1010 considering the weights w1, w2, and w3 depending on the distance between the fourth omni-directional image O4 and each of the first omni-directional image O1, the second omni-directional image O2, and the third omni-directional image O3.

When the difference in pixel value between the eighth 2D image corresponding to the first omni-directional image O1, the ninth 2D image corresponding to the second omni-directional image O2, and the tenth 2D image corresponding to the third omni-directional image O3 is not more than a predetermined threshold, the processor calculates weights in inverse order of distance.

For example, when the distance between the first omni-directional image O1 and the fourth omni-directional image O4 is 2, the distance between the second omni-directional image O2 and the fourth omni-directional image O4 is 3, and the distance between the third omni-directional image O3 and the fourth omni-directional image O4 is 5, weight w1 between the first omni-directional image O1 and the fourth omni-directional image O4 may be calculated as (½)/(½+⅓+⅕). Weight w2 between the second omni-directional image O2 and the fourth omni-directional image O4 may be calculated as (⅓)/(½+⅓+⅕), and weight w3 between the third omni-directional image O3 and the fourth omni-directional image O4 may be calculated as (⅕)/(½+⅓+⅕).

In other words, the weight corresponding to the omni-directional image which is positioned closer to the fourth omni-directional image O4 may be determined to be higher.

Accordingly, the processor may generate the fourth 2D image 1004 by synthesizing the eighth 2D image 1008, the ninth 2D image 1009, and the tenth 2D image 1010 considering the calculated weights w1, w2, and w3.

The sum of the weights w1, w2, and w3 is 1, and there may be various methods of calculating the weights w1, w2, and w3, including, but not limited to, winner takes all which considers only one of the weights w1, w2, and w3 and weighted sum which considers the sum of the weights w1, w2, and w3.

When the difference in pixel value between the eighth 2D image corresponding to the first omni-directional image O1, the ninth 2D image corresponding to the second omni-directional image O2, and the tenth 2D image corresponding to the third omni-directional image O3 is not less than a predetermined threshold, the processor may use the red-green-blue (RGB) value of the 2D image corresponding to the smallest pixel value difference among the pixel value differences in the eighth 2D image corresponding to the first omni-directional image O1, the ninth 2D image corresponding to the second omni-directional image O2, and the tenth 2D image corresponding to the third omni-directional image O3 in synthesizing the tenth 2D image 1010. For example, when the 2D image corresponding to the smallest pixel value difference is the eighth 2D image 1008, the processor may generate the fourth 2D image 1004 by synthesizing the eighth 2D image 1008, the ninth 2D image 1009, and the tenth 2D image 1010 using the RGB value of the eighth 2D image 1008.

By so doing, the processor may generate the fourth 2D image corresponding to the fourth omni-directional image O4 which is positioned in any space. The processor may crate the fourth 2D image corresponding to the fourth omni-directional image O4 with a smaller error in pixel value considering the weight depending on the distance between the fourth omni-directional image O4 and each of the first omni-directional image O1, the second omni-directional image O2, and the third omni-directional image O3. In other words, the fourth 2D image corresponding to the fourth omni-directional image O4 may be generated with respect to the high-reliable omni-directional image by considering the weight depending on the distance.

Figure 12:
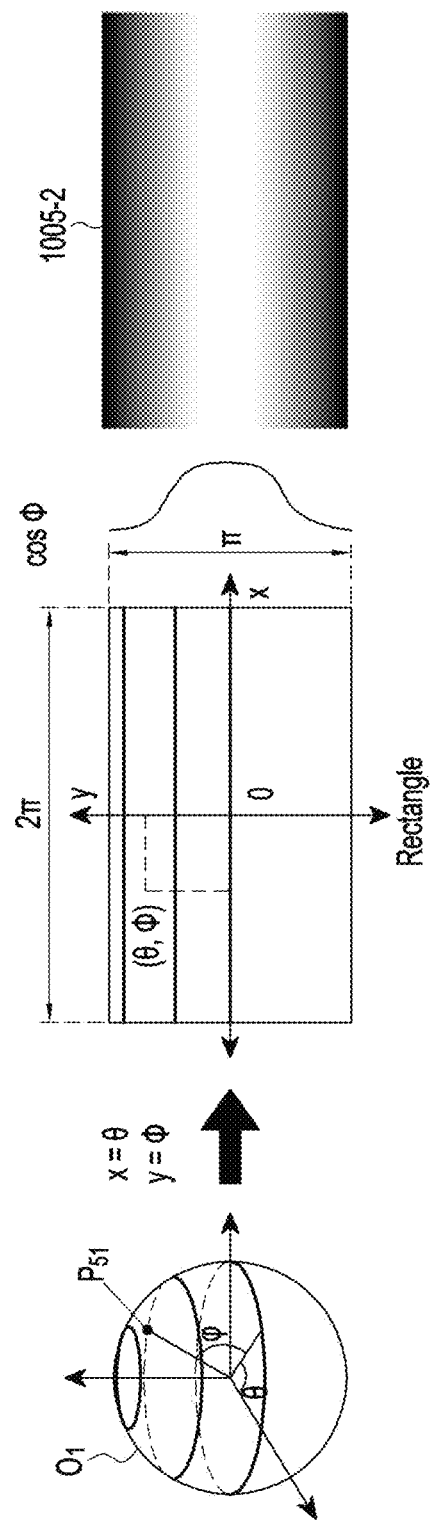
FIG. 12 is a view illustrating a weight map according to an embodiment of the disclosure.

FIG. 12 is a view illustrating a weight map according to an embodiment of the disclosure.

Referring to FIG. 12, the weight map 1005-2 of the first omni-directional image O1 may be constituted of the cos θ values of the pixels. For example, the coordinates corresponding to the pixel corresponding to the first position P51 of the first omni-directional image O1 may be (0, 0), and the weight sum corresponding to (0, 0) may be cos θ. Although the weight map 1005-2 of the first omni-directional image O1 is taken as an example for illustration purposes, the weight maps (not shown) of the second omni-directional image O2 and the third omni-directional image O3 may also be constituted of the cos θ values of pixels.

Although the weight map is constituted of the cos θ values of pixels for illustration purposes, the weight map is not limited thereto but may rather be constituted of other various values representing weights.

Figure 13:
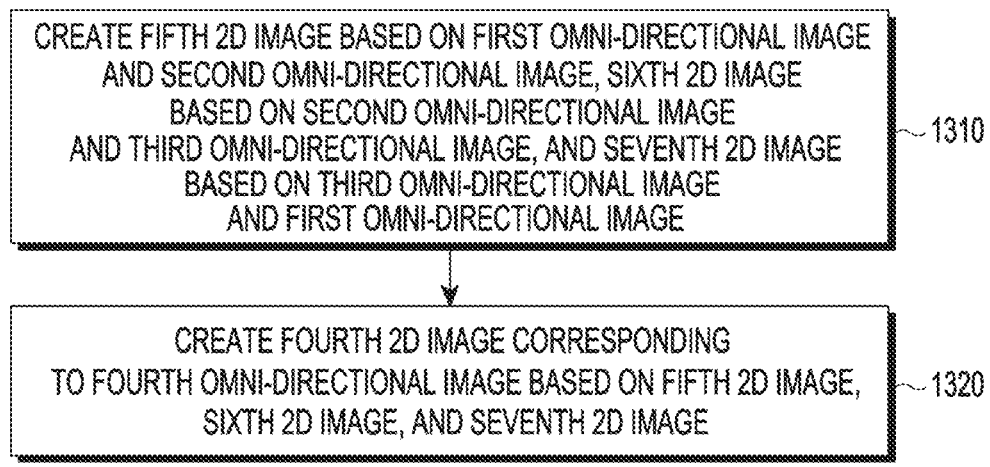
FIG. 13 is a flowchart illustrating a control example for processing an omni-directional image according to an embodiment of the disclosure.

FIG. 13 is a flowchart illustrating a control example for processing an omni-directional image according to an embodiment of the disclosure.

Referring to FIG. 13, in operation 1310, the processor may generate a fifth 2D image based on a first omni-directional image and a second omni-directional image, a sixth 2D image based on the second omni-directional image and a third omni-directional image, and a seventh 2D image based on the third omni-directional image and the first omni-directional image. The details of operation 1310 have been described above in connection with FIG. 10A.

In operation 1320, the processor may generate a fourth 2D image corresponding to a fourth omni-directional image based on the fifth 2D image, the sixth 2D image, and the seventh 2D image. The details of operation 1320 have been described above in connection with FIG. 10B.

Operations 1310 and 1320 of FIG. 13 may be performed by a device (e.g., a server) for transmitting data about omni-directional images. According to an embodiment, operations 1310 and 1320 of FIG. 13 may be performed by a device (e.g., a VR device) for displaying data about omni-directional images.

Figure 14:
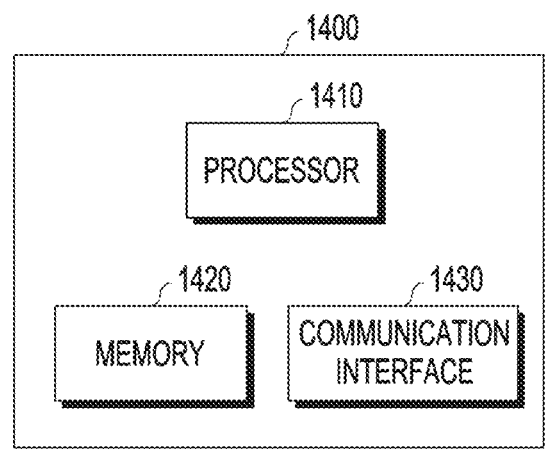
FIG. 14 is a view illustrating a device for processing omni-directional images according to an embodiment of the disclosure.

FIG. 14 is a view illustrating a device for processing omni-directional images according to an embodiment of the disclosure.

Referring to FIG. 14, a device 1400 for processing omni-directional images may be a device (e.g., a server) for transmitting data regarding omni-directional images. When there are two cameras, the device 1400 may generate data about the third omni-directional image O3 by the above-described methods and transmit the generated data. The data about the third omni-directional image O3 may be based on a 2D image corresponding to a 2D image projected in an ERP scheme from the third omni-directional image O3. The device 1400 may transmit the data about the 2D image corresponding to the 2D image projected in the ERP scheme from the third omni-directional image O3 using a protocol, e.g., moving picture experts group (MPEG). According to an embodiment, for easier display on the receive part, the device 1400 may convert the generated 2D image into a 2D image corresponding to the 2D image projected in the ERP scheme based on the different poles of the third omni-directional image O3. Transmission of data about the 2D image may be based on the converted 2D image. According to an embodiment, region-wise packing may be performed on the 2D image. Region-wise packing means splitting the 2D image into a plurality of regions and performing transforming, rotation, resampling, or rearrangement on each of the plurality of regions.

When there are three or more cameras, the device 1400 may generate data about the fourth omni-directional image O4 by the above-described methods and transmit the generated data. The data about the fourth omni-directional image O4 may be based on a 2D image corresponding to a 2D image projected in an ERP scheme from the fourth omni-directional image O4. The device 1400 may transmit the data about the 2D image corresponding to the 2D image projected in the ERP scheme from the fourth omni-directional image O4 using a protocol, e.g., MPEG. According to an embodiment, for easier display on the receive part, the device 1400 may convert the generated 2D image into a 2D image corresponding to the 2D image projected in the ERP scheme based on the different poles of the fourth omni-directional image O4. Transmission of data about the 2D image may be based on the converted 2D image. According to an embodiment, region-wise packing may be performed on the 2D image. Region-wise packing means splitting the 2D image into a plurality of regions and performing transforming, rotation, resampling, or rearrangement on each of the plurality of regions.

The device 1400 may include a processor 1410, a memory 120, and a communication interface 1430. The processor 1410 may substantially perform operations on the device 1400 and control the device 1400. The processor 1410 may be connected with the memory 1420 and the communication interface 1430 in an electrically communicable manner and may control the operation of the memory 1420 and the communication interface 1430. Operations directly performed by the memory 1420 and the communication interface 1430 may be interpreted as performed substantially by the processor 1410. The memory 1420 may store transient or non-transient data necessary for the operation of the device 1400 or the processor 1410. The memory 1420 may store commands, instructions or codes executable on the processor 1410. The communication interface 1430 may be configured to perform data transmission and/or reception.

Figure 15:
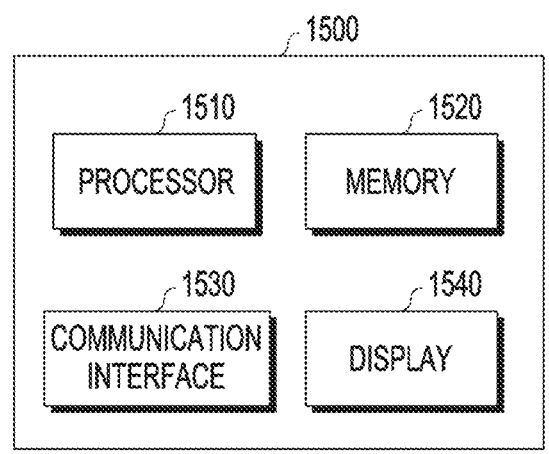
FIG. 15 is a view illustrating a device for processing omni-directional images according to an embodiment of the disclosure.

FIG. 15 is a view illustrating a device for processing omni-directional images according to an embodiment of the disclosure.

Referring to FIG. 15, a device 1500 may be a device (e.g., a VR device) for displaying omni-directional images. The device 1500 may receive and display data regarding omni-directional images. When there are two cameras, the device may receive data regarding the third omni-directional image O3 which is based on the image projected in the ERP scheme from the third omni-directional image O3 as generated by the above-described methods and may display at least part of the third omni-directional image O3 based on the received data.

When there are three cameras, the device may receive data regarding the third omni-directional image O3 which is based on the image projected in the ERP scheme from the third omni-directional image O3 as generated by the above-described methods and may display at least part of the third omni-directional image O3 based on the received data.

According to an embodiment, when there are two cameras, the device 1500 may receive data regarding the first omni-directional image O1 and data regarding the second omni-directional image O2. The data regarding the first omni-directional image O1 may be data about the first 2D image E1, and the data regarding the second omni-directional image O2 may be data about the second 2D image E2. The device 1500 may generate data regarding the 2D image corresponding to the image projected in the ERP scheme from the third omni-directional image O3 according to the above-described methods based on the data regarding the first 2D image E1 and the data regarding the second 2D image E2. The device 1500 may display at least part of the third omni-directional image O3 based on the generated 2D image-related data.

According to an embodiment, when there are three or more cameras, the device 1500 may receive the data regarding the first omni-directional image O1, the data regarding the second omni-directional image O2, and the data regarding the third omni-directional image O3. The data regarding the first omni-directional image O1 may be data about the first 2D image E1, the data regarding the second omni-directional image O2 may be data about the second 2D image E2, and the data regarding the third omni-directional image O3 may be data about the third 2D image E3. The device 1500 may generate data regarding the 2D image corresponding to the image projected in the ERP scheme from the fourth omni-directional image O4 according to the above-described methods based on the data regarding the first 2D image E1, the data regarding the second 2D image E2, and the data regarding the third 2D image E3. The device 1500 may display at least part of the fourth omni-directional image O4 based on the generated 2D image-related data.

The device 1500 may include a processor 1510, a memory 1520, a communication interface 1530, and a display 1540. Substantially the same description given for the processor 1410, memory 1420, and communication interface 1430 of the device 1400 of FIG. 14 may apply to the processor 1510, memory 1520, and communication interface 1530. The display 1540 may display images under the control of the processor 1510.

As is apparent from the foregoing description, generating or providing omni-directional images based on various embodiments of the disclosure may relieve the computation load of generating VR or AR-supporting content.

While the disclosure has been shown and described with reference to various embodiments thereof, it will be understood by those skilled in the art that various changes in forms and details may be made therein without departing from the spirit and scope of the disclosure as defined by the appended claims and their equivalents.

What is claimed is:

1. A method for processing information regarding an omni-directional image, the method comprising:

generating a first two-dimensional (2D) image projected from a first omni-directional image based on a position crossing a straight line passing through a first position which is a center of the first omni-directional image and a second position which is a center of a second omni-directional image;

generating a second 2D image projected from the second omni-directional image based on the position crossing the straight line passing through the first position and the second position;
generating a third 2D image corresponding to a 2D image projected from a third omni-directional image having a center in a third position between the first position and the second position;
generating a fourth 2D image projected from a fourth omni-directional image based on a position crossing a straight line passing through the center of the second omni-directional image and a center of the fourth omni-directional image;
generating a fifth 2D image corresponding to a 2D image projected from a fifth omni-directional image having a center in a fifth position between the second position and the fourth position based on the second 2D image and the fourth 2D image;
generating a sixth 2D image corresponding to a 2D image projected from a sixth omni-directional image having a center in a sixth position between the first position and the fourth position based on the first 2D image and the fourth 2D image; and
generating a seventh 2D image corresponding to a 2D image projected from a seventh omni-directional image having a center in a seventh position between the first position, the second position, and the fourth position based on the third 2D image, the fifth 2D image, the sixth 2D image, a weight for the first omni-directional image, a weight for the second omni-directional image, and a weight for the fourth omni-directional image.

2. The method of claim 1,
wherein the generating of the third 2D image comprises identifying third coordinates on the third 2D image corresponding to first coordinates on the first 2D image and second coordinates on the second 2D image which correspond to the same position,
wherein y values of the first coordinates, the second coordinates, and the third coordinates are identical to each other,
wherein $$\theta_C = \theta_L - \alpha,$$

$$\alpha = \tan^{-1}\left(\frac{\sin(\theta_L - \theta_R)}{\frac{(1-a)}{a\sin\theta_L} + \cos(\theta_L - \theta_R)}\right),$$

and
wherein
$\theta_C$ is an x value of the third coordinates,
$\theta_L$ is an x value of the first coordinates,
$\theta_R$ is an x value of the second coordinates, and
$\alpha$ is a ratio of a distance between the first position and the third position to a distance between the first position and the second position.

3. The method of claim 1,
wherein the generating of the third 2D image comprises identifying third coordinates on the third 2D image corresponding to first coordinates on the first 2D image and second coordinates on the second 2D image which correspond to the same position,
wherein y values of the first coordinates, the second coordinates, and the third coordinates are identical to each other, and
wherein $$x3 = x1 - a*(x1 - x2),$$

x1 is an x value of the first coordinates,
x2 is an x value of the second coordinates,
x3 is an x value of the third coordinates, and
$\alpha$ is a ratio of a distance between the first position and the third position to a distance between the first position and the second position.

4. The method of claim 1, further comprising:
converting the third 2D image into the fourth 2D image,
wherein the third 2D image corresponds to a 2D image projected with points on the third omni-directional image crossing the straight line passing through the first position and the second position set to a fifth pole and a sixth pole, and
wherein the fourth 2D image corresponds to a 2D image projected from the third omni-directional image based on poles different from the fifth pole and the sixth pole.

5. The method of claim 1, further comprising transmitting information regarding the third omni-directional image based on the third 2D image.

6. The method of claim 1, wherein the first omni-directional image, the second omni-directional image, and the third omni-directional image each are rendered in a spherical shape.

7. The method of claim 1,
wherein the first 2D image and the second 2D image are projected in an equirectangular projection (ERP) scheme from the first omni-directional image and the second omni-directional image, respectively, and
wherein the third 2D image corresponds to a 2D image projected in the ERP scheme from the third omni-directional image, with points on the third omni-directional image crossing the straight line from the third omni-directional image set to a fifth pole and a sixth pole.

8. The method of claim 1,
wherein the first omni-directional image is obtained by a first camera located in the first position, and
wherein the second omni-directional image is obtained by a second camera located in the second position.

9. The method of claim 1, wherein the third position is one of a plurality of quantized positions on the straight line between the first position and the second position.

10. The method of claim 9, wherein the third position is a position closest to a device for displaying the third omni-directional image among the plurality of quantized positions.

11. The method of claim 1, wherein the weight for the first omni-directional image, the weight for the second omni-directional image, and the weight for the fourth omni-directional image, respectively, are determined by a distance between the first omni-directional image and the seventh omni-directional image, a distance between the second omni-directional image and the seventh omni-directional image, and a distance between the fourth omni-directional image and the seventh omni-directional image.

12. A device for processing information regarding an omni-directional image, the device comprising:
a communication interface; and
a processor connected with the communication interface,
wherein the processor is configured to:
generate a first two-dimensional (2D) image projected from a first omni-directional image based on a position crossing a straight line passing through a first position which is a center of the first omni-directional image and a second position which is a center of a second omni-directional image, generate a second 2D image projected from the second omni-directional image based on the position crossing the straight line passing through the first position and the second position, generate a third 2D image corresponding to a 2D image projected from a third omni-directional image having a center in a third position between the first position and the second position, generate a fourth 2D image projected from a fourth omni-directional image based on a position crossing a straight line passing through the center of the second omni-directional image and a center of the fourth omni-directional image, generate a fifth 2D image corresponding to a 2D image projected from a fifth omni-directional image having a center in a fifth position between the second position and the fourth position based on the second 2D image and the fourth 2D image, generate a sixth 2D image corresponding to a 2D image projected from a sixth omni-directional image having a center in a sixth position between the first position and the fourth position based on the first 2D image and the fourth 2D image, and generate a seventh 2D image corresponding to a 2D image projected from a seventh omni-directional image having a center in a seventh position between the first position, the second position, and the fourth position based on the third 2D image, the fifth 2D image, the sixth 2D image, a weight for the first omni-directional image, a weight for the second omni-directional image, and a weight for the fourth omni-directional image.

13. The device of claim 12,
wherein the processor is further configured to identify third coordinates on the third 2D image corresponding to first coordinates on the first 2D image and second coordinates on the second 2D image which correspond to the same position, wherein y values of the first coordinates, the second coordinates, and the third coordinates are identical to each other, wherein $$\theta_C = \theta_L - \alpha,$$

$$\alpha = \tan^{-1}\left(\frac{\sin(\theta_L - \theta_R)}{\frac{(1-a)}{a\sin\theta_L} + \cos(\theta_L - \theta_R)}\right),$$

and wherein $\theta_C$ is an x value of the third coordinates,
$\theta_L$ is an x value of the first coordinates,
$\theta_R$ is an x value of the second coordinates, and
$\alpha$ is a ratio of a distance between the first position and the third position to a distance between the first position and the second position.

14. The device of claim 12,
wherein the processor is further configured to identify third coordinates on the third 2D image corresponding to first coordinates on the first 2D image and second coordinates on the second 2D image which correspond to the same position, wherein y values of the first coordinates, the second coordinates, and the third coordinates are identical to each other, and
wherein $$x3 = x1 - a*(x1 - x2),$$

x1 is an x value of the first coordinates,
x2 is an x value of the second coordinates,
x3 is an x value of the third coordinates, and
$\alpha$ is a ratio of a distance between the first position and the third position to a distance between the first position and the second position.

15. The device of claim 12,
wherein the processor is further configured to convert the third 2D image into a fourth 2D image,
wherein the third 2D image corresponds to a 2D image projected with points on the third omni-directional image crossing the straight line passing through the first position and the second position set to a fifth pole and a sixth pole, and
wherein the fourth 2D image corresponds to a 2D image projected from the third omni-directional image based on poles different from the fifth pole and the sixth pole.

16. The device of claim 12, wherein the processor is further configured to transmit information regarding the third omni-directional image based on the third 2D image.

17. The device of claim 12, wherein the first omni-directional image, the second omni-directional image, and the third omni-directional image each are rendered in a spherical shape.

18. The device of claim 12,
wherein the first 2D image and the second 2D image are projected in an equirectangular projection (ERP) scheme from the first omni-directional image and the second omni-directional image, respectively, and
wherein the third 2D image corresponds to a 2D image projected in the ERP scheme from the third omni-directional image, with points on the third omni-directional image crossing the straight line from the third omni-directional image set to a fifth pole and a sixth pole.

19. The device of claim 12,
wherein the first omni-directional image is obtained by a first camera located in the first position, and the second omni-directional image is obtained by a second camera located in the second position, and
wherein the third position is a position closest to a device for displaying the third omni-directional image among the plurality of quantized positions.

20. The device of claim 12,
wherein the third position is one of a plurality of quantized positions on the straight line between the first position and the second position, and
wherein the weight for the first omni-directional image, the weight for the second omni-directional image, and the weight for the fourth omni-directional image, respectively, are determined by a distance between the first omni-directional image and the seventh omni-directional image, a distance between the second omni-directional image and the seventh omni-directional image, and a distance between the fourth omni-directional image and the seventh omni-directional image.

* * * * *